United States Patent
Lee et al.

(10) Patent No.: US 11,699,951 B2
(45) Date of Patent: Jul. 11, 2023

(54) DC-DC CONVERTER AND METHOD FOR CONTROLLING THE SAME

(71) Applicants: HYUNDAI MOTOR COMPANY, Seoul (KR); KIA CORPORATION, Seoul (KR)

(72) Inventors: Yoo Jong Lee, Osan-si (KR); Ji Woong Jang, Gwangmyeong-si (KR); Ki Jong Lee, Hwaseong-si (KR); Sang Cheol Shin, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 130 days.

(21) Appl. No.: 17/409,308

(22) Filed: Aug. 23, 2021

(65) Prior Publication Data

US 2022/0149733 A1 May 12, 2022

(30) Foreign Application Priority Data

Nov. 10, 2020 (KR) .......................... 10-2020-0149452

(51) Int. Cl.
*H02M 3/07* (2006.01)
*H02M 1/32* (2007.01)
*H02M 3/158* (2006.01)
*H02M 1/00* (2006.01)

(52) U.S. Cl.
CPC ........... *H02M 3/07* (2013.01); *H02M 1/0095* (2021.05); *H02M 1/32* (2013.01); *H02M 3/158* (2013.01)

(58) Field of Classification Search
CPC .......... H02M 3/07; H02M 3/158; H02M 1/32; H02M 1/0095
See application file for complete search history.

(56) References Cited

U.S. PATENT DOCUMENTS

| | | | |
|---|---|---|---|
| 7,746,041 B2 | 6/2010 | Xu et al. | |
| 2018/0034364 A1* | 2/2018 | Nakada | .................... H02M 3/07 |
| 2021/0257907 A1* | 8/2021 | Lai | ........................... H02M 1/32 |
| 2022/0294362 A1* | 9/2022 | Liu | ......................... H02M 1/32 |
| 2022/0393578 A1* | 12/2022 | Ye | ......................... H02M 7/483 |

FOREIGN PATENT DOCUMENTS

WO  2016/125682  8/2016

* cited by examiner

*Primary Examiner* — Rafael O De Leon Domenech
(74) *Attorney, Agent, or Firm* — Fox Rothschild LLP

(57) ABSTRACT

A DC-DC converter includes: a first capacitor; a first switching element, a second switching element, a third switching element, and a fourth switching element sequentially connected to one another in series between both ends of the first capacitor; a second capacitor having both ends connected at a connection node of the first switching element and the second switching element and a connection node of the third switching element and the fourth switching element, respectively; and a controller configured to determine whether an overvoltage is applied to both ends of the first to fourth switching elements, respectively, based on a first sensed voltage obtained by sensing a voltage applied to the first capacitor and a second sensed voltage obtained by sensing a voltage applied to the second capacitor.

15 Claims, 6 Drawing Sheets

DC-DC CONVERTER AND METHOD FOR CONTROLLING THE SAME

CROSS REFERENCE TO RELATED APPLICATION

The present application claims priority to and the benefit of Korean Patent Application No. 10-2020-0149452, filed Nov. 10, 2020, the entire contents of which is incorporated herein for all purposes by this reference.

TECHNICAL FIELD

The present disclosure relates to a DC-DC converter, and more particularly to, a DC-DC converter including a flying capacitor applying an overvoltage to both ends of the switching element, and a control method thereof.

BACKGROUND

In general, a DC-DC converter, which is a device changing a magnitude of an input direct current (DC) voltage to a desired magnitude, has been widely used in various electric and electric power fields.

A technology of a conventional DC-DC converter in which amounts of energy storage and energy release of an inductor are controlled using an on/off operation of a semiconductor switching element to convert one DC voltage into another DC voltage, has been widely known. The inductor applied to such a conventional DC-DC converter has a large size and a heavy weight, which is disadvantageous.

In order to solve the problems of the size and weight of the inductor, a technology, in which the inductor is reduced in size and weight by decreasing a voltage applied to the inductor using charging and discharging of a capacitor and decreasing an inductance value provided by the inductor, has been developed.

One of such technologies includes a DC-DC converter connecting a plurality of switching elements in series and including a flying capacitor between some of the switching elements.

The DC-DC converter including a conventionally proposed flying capacitor senses a voltage at both ends of the capacitor provided at an input terminal or an output terminal and the flying capacitor in order to control the additionally applied voltage of the flying capacitor at a certain level. The conventional flying capacitor may prevent an overvoltage from being applied to the both ends of the corresponding capacitor by sensing the voltage of each capacitor.

However, in the DC-DC converter including the conventional flying capacitor, the voltage at both ends of each switching element are not sensed such that there is no separate measure for preventing an overvoltage that exceeds an internal voltage of the switching element from being applied to the switching element is not being prepared.

The contents described as the related art have been provided only to assist in understanding the background of the present disclosure and should not be considered as corresponding to the related art known to those having ordinary skill in the art.

SUMMARY

The present disclosure provides a DC-DC converter including a flying capacitor and capable of preventing a plurality of switching elements provided in the converter from being damaged in advance by applying an overvoltage to both ends of the switching elements, and a control method thereof.

According to an form of the present disclosure, a DC-DC converter includes: a first capacitor; a first switching element, a second switching element, a second switching element, and a fourth switching element sequentially connected to one another in series between both ends of the first capacitor; a second capacitor having both ends connected at a connection node of the first switching element and the second switching element and a connection node of the third switching element and the fourth switching element, respectively; and a controller determining whether or not an overvoltage is applied to both ends of the first to fourth switching elements, respectively, based on a first sensed voltage obtained by sensing a voltage applied to the first capacitor and a second sensed voltage obtained by sensing a voltage applied to the second capacitor.

The controller may control states of the second switching element and the third switching element to be complementary to each other, and determine whether or not the overvoltage is applied to the both ends of the second switching element or third switching element based on a result of comparison between the second sensed voltage and a preset reference value for overvoltage determination.

The controller may determine that the overvoltage is applied to the both ends of the second switching element or third switching element when the second sensed voltage is larger than the preset reference value for overvoltage determination.

The controller may determine that the overvoltage is applied to the both ends of the second switching element or third switching element when the number of times of determination that the second determination voltage is larger than the preset reference value for overvoltage determination exceeds the preset reference value.

The controller may control states of the first switching element and the fourth switching element to be complementary to each other, and determine whether or not the overvoltage is applied to the both ends of the first switching element or fourth switching element based on a result of comparison between a difference value and a preset reference value for overvoltage determination, the difference value obtained by subtracting the second sensed voltage from the first sensed voltage.

The controller may determine that the overvoltage is applied to the both ends of the first switching element or fourth switching element when the difference value obtained by subtracting the second sensed voltage from the first sensed voltage is larger than the preset reference value for overvoltage determination.

The controller may determine that the overvoltage is applied to the both ends of the first switching element or fourth switching element when the number of times of determination that the difference value obtained by subtracting the second sensed voltage from the first sensed voltage is larger than the preset reference value for overvoltage determination exceeds the preset reference value.

The reference value for overvoltage determination may have a smaller value than an internal voltage defined by a specification of the first to fourth switching elements by applying a predetermined margin to the internal voltage defined in the specification.

In another form of the present disclosure, a control method of a DC-DC converter including a first capacitor, a first switching element, a second switching element, a third switching element, and a fourth switching element sequentially connected to one another in series between both ends of the first capacitor, and a second capacitor having both ends connected at a connection node of the first switching element and the second switching element and a connection node of the third switching element and the fourth switching element, respectively, the control method includes: controlling states of the second switching element and the third switching element to be complementary to each other; sensing a voltage applied to the second capacitor; comparing a sensed voltage obtained by sensing the voltage applied to the second capacitor with a preset reference value for overvoltage determination; and determining that an overvoltage is applied to the both ends of the second switching element or third switching element when the sensed voltage is larger than the preset reference value.

In the determining, it may be determined that the overvoltage is applied to the both ends of the second switching element or third switching element when the number of times of determination that the second determination voltage is larger than the preset reference value for overvoltage determination exceeds a preset reference value.

In another form of the present disclosure, a control method of a DC-DC converter including a first capacitor, a first switching element, a second switching element, a third switching element, and a fourth switching element sequentially connected to one another in series between both ends of the first capacitor, and a second capacitor having both ends connected at a connection node of the first switching element and the second switching element and a connection node of the third switching element and the fourth switching element, respectively, the control method includes: controlling states of the first switching element and the fourth switching element to be complementary to each other; sensing a voltage applied to the first capacitor and a voltage applied to the second capacitor; comparing a difference value with a predetermined reference value for overvoltage determination, the difference value obtained by subtracting a second sensed voltage obtained by sensing the voltage applied to the second capacitor from a first sensed voltage obtained by sensing the voltage applied to the first capacitor; and determining that an overvoltage is applied to the both ends of the first switching element or fourth switching element when the difference value is larger than the preset reference value for overvoltage determination.

In the determining, it may be determined that the overvoltage is applied to the both ends of the first switching element or fourth switching element when the number of times of determination that the difference value is larger than the preset reference value for overvoltage determination exceeds the preset reference value for overvoltage determination.

The reference value for overvoltage determination may have a smaller value than an internal voltage defined by a specification of the first to fourth switching elements by applying a predetermined margin to the internal voltage defined in the specification.

DRAWINGS

DETAILED DESCRIPTION

Hereinafter, a DC-DC converter according to various forms of the present disclosure will be described in detail with reference to the accompanying drawings.

Figure 1:
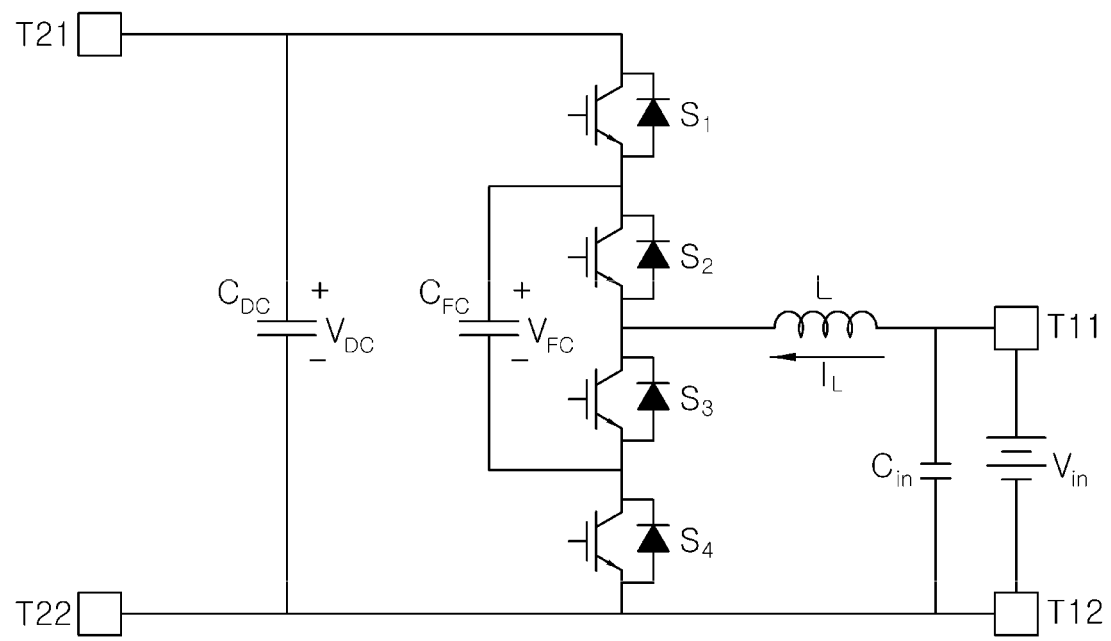
FIG. 1 is a circuit diagram of a DC-DC converter in one form of the present disclosure.
Figure 1:
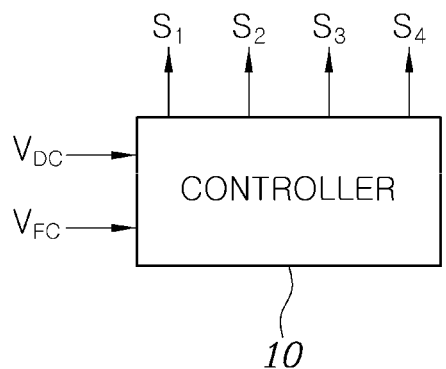

FIG. 1 is a circuit diagram of a DC-DC converter in some forms of the present disclosure.

Referring to FIG. 1, the DC-DC converter in some forms of the present disclosure may be a converter having a battery between a first terminal T11 and a second terminal T12, boosting a voltage $V_{in}$ of the battery to output the voltage $V_{in}$ as a voltage $V_{DC}$ between a third terminal T21 and a fourth terminal T22. For example, a load is connected between the third terminal T21 and the fourth terminal T22.

In more detail, the DC-DC converter in some forms of the present disclosure may include a first capacitor $C_{DC}$ having both ends connected to the third terminal T21 and the fourth terminal T22, respectively; a first switching element $S_1$, a second switching element $S_2$, a third switching element $S_3$, and a fourth switching element $S_4$ sequentially connected to one another in series between the both ends of the first capacitor $C_{DC}$; a second capacitor $C_{FC}$ having both ends connected to a connection node of the first switching element $S_1$ and the second switching element $S_2$ and a connection node of the third switching element $S_3$ and the fourth switching element $S_4$, respectively; an inductor L having one end connected to a connection node of the second switching element $S_2$ and the third switching element $S_3$; and a controller 10 controlling an on/off state of the first to fourth switching elements $S_1$ to $S_4$.

The first capacitor $C_{DC}$ is a kind of smoothing capacitor connected between the third terminal T21 and the fourth terminal T22. Although not illustrated in FIG. 1, an additional smoothing capacitor may be connected between the first terminal T11 and the second terminal T12.

The first to fourth switching elements $S_1$ to $S_4$ may be sequentially connected in series from one end toward the other end of the first capacitor $C_{DC}$. Each of the first to fourth switching elements $S_1$ to $S_4$ may be implemented as an insulated gate bipolar mode transistor (IGBT), and the on/off state of the first to fourth switching elements $S_1$ to $S_4$ may be controlled as an on/off control signal of the controller 10 is input to a gate of the IGBT. Obviously, the first to fourth switching elements $S_1$ to $S_4$ may be implemented various switching elements known in the art capable of replacing the IGBT.

The second capacitor $C_{FC}$, which is a flying capacitor, may have the both ends connected to the connection node of the first switching element $S_1$ and the second switching element $S_2$ and the connection node of the third switching element $S_3$ and the fourth switching element $S_4$, respectively.

Although not illustrated, the DC-DC converter in some forms of the present disclosure may include various sensors for sensing information in a circuit required for computation to control the switching elements $S_1$ to $S_4$ to turn on/off by the controller 10. First, a voltage sensor for sensing the voltage $V_{in}$ between the first terminal T11 and the second terminal T12 or the voltage $V_{DC}$ between the third terminal T21 and the fourth terminal T22 may be provided, a voltage sensor for sensing a voltage $V_{FC}$ of the second capacitor $C_{FC}$ may be provided, and a current sensor for sensing a magnitude of a current flowing through the inductor L may be provided. Sensed voltages and a sensed current sensed by the voltage sensors and the current sensor may be supplied in the controller 10.

The controller 10 may receive a voltage between the third terminal T21 and the fourth terminal T22 corresponding to an output voltage of the converter, that is, a first sensed voltage obtained by sensing the voltage $V_{DC}$ at the both ends of the first capacitor $C_{DC}$.

Further, the controller 10 may compare the first sensed voltage with a first voltage command for the first sensed voltage to calculate an error of the comparison. Here, the first voltage command may be a voltage value that the DC-DC converter set by a high-level controller or the like is desired to output.

Further, the controller 10 may receive a sensed voltage obtained by sensing the voltage $V_{FC}$ applied to the second capacitor $C_{FC}$ corresponding to a flying capacitor and compare the received voltage $V_{FC}$ with a second voltage command to calculate an error of the comparison. Here, the second voltage command is a value preset by the high-level controller or the like, and may be a value corresponding to about ½ of the voltage of the first capacitor $C_{DC}$.

Figure 2:
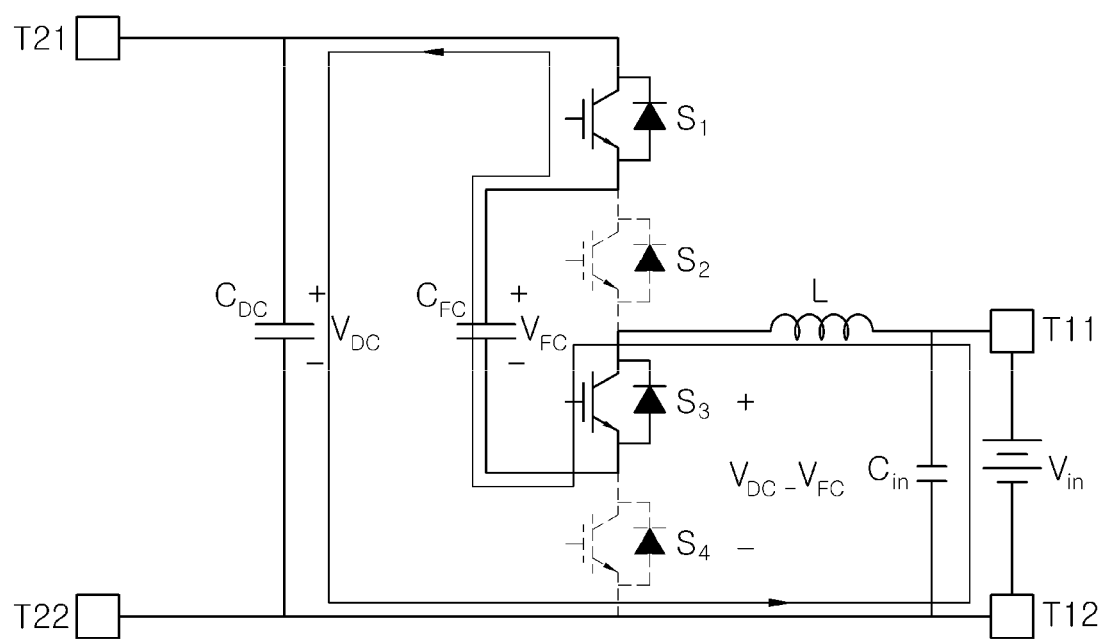
FIGS. 2 to 4 are diagrams illustrating a state of an electric flow of a DC-DC converter in one form of the present disclosure.
Figure 3:
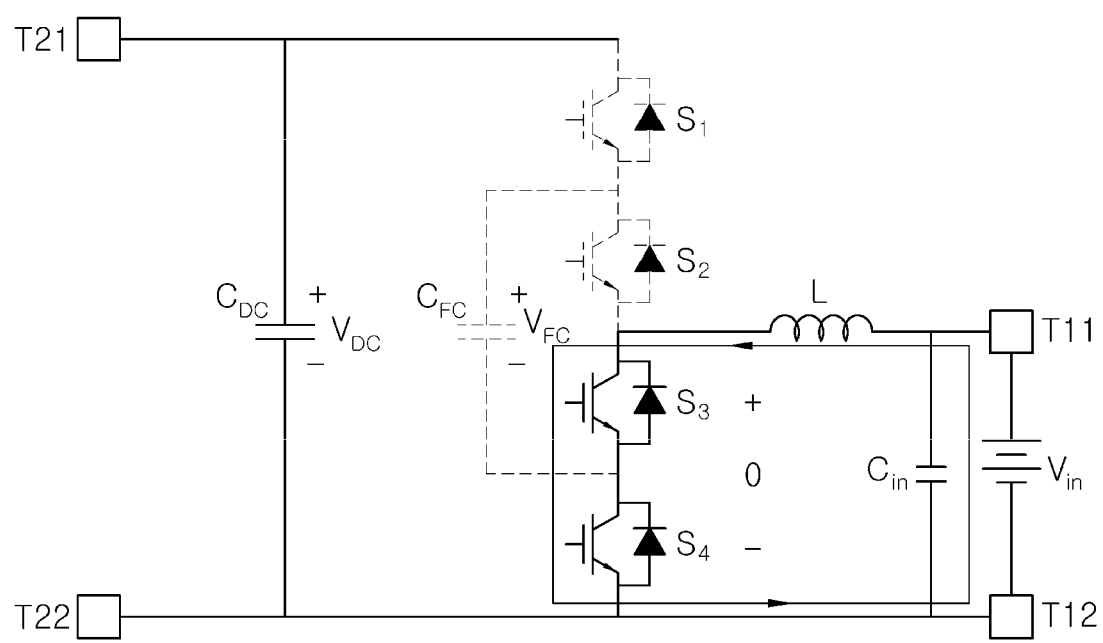
Figure 4:
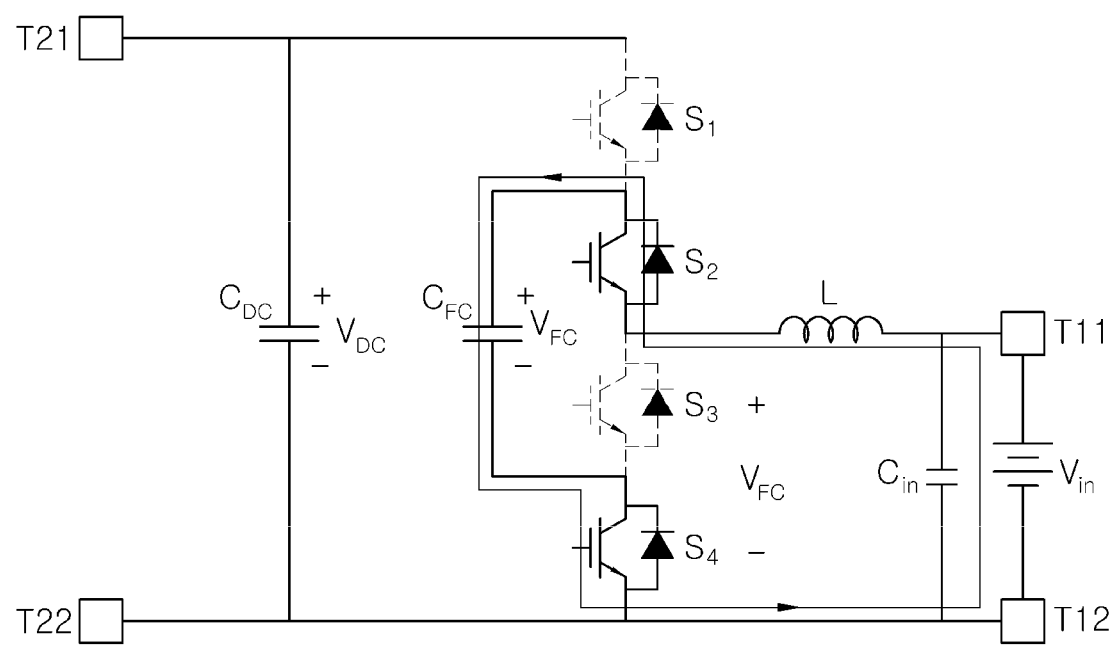

FIGS. 2 to 4 are diagrams illustrating a state of an electric flow of a DC-DC converter in some forms of the present disclosure.

FIG. 2 illustrates a first state in which the first switching element $S_1$ and the third switching element $S_3$ are turned on, and the second switching element $S_2$ and the fourth switching element $S_4$ are turned off. In the first state, a voltage of a value obtained by subtracting the voltage $V_c$ of the flying capacitor $C_{FC}$ from the voltage $V_{DC}$ of the capacitor $C_{DC}$ is applied to a connection node of the inductor L and the switching element $S_2$ or $S_3$.

FIG. 3 illustrates a second state in which the third switching element $S_3$ and the fourth switching element $S_4$ are turned on, and the first switching element $S_1$ and the second switching element $S_2$ are turned off. In the second state, the voltage is not applied to the connection node of the inductor L and the switching element $S_2$ or $S_3$.

FIG. 4 illustrates a third state in which the second switching element $S_2$ and the fourth switching element $S_4$ are turned on, and the first switching element $S_1$ and the third switching element $S_3$ are turned off. In the third state, the entire voltage $V_{FC}$ of the flying capacitor $C_{FC}$ is applied to the connection node of the inductor L and the switching element $S_2$ or $S_3$.

Figure 5:
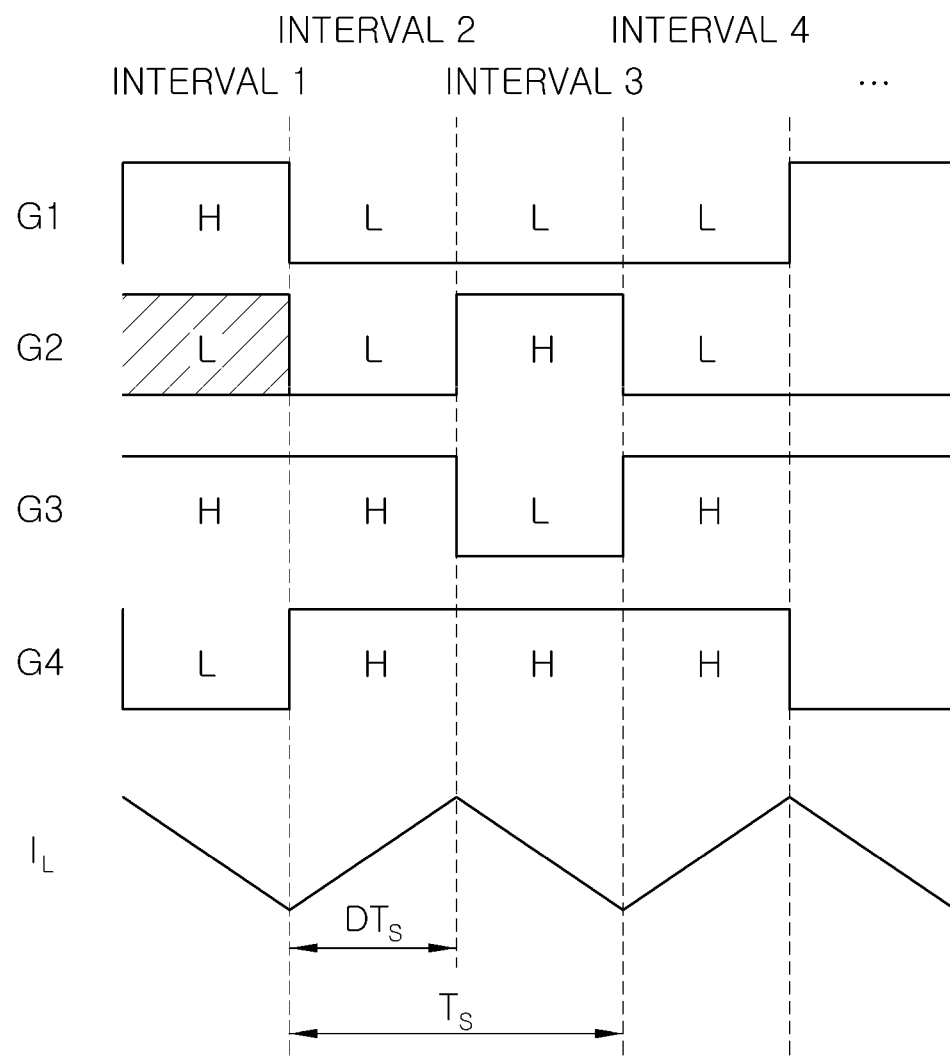
FIG. 5 is a graph illustrating a control example of a gate voltage of a switching element when the converter with a flying capacitor is boosted, and a change in inductor current according to the control example.

FIG. 5 is a graph illustrating a control example of a gate voltage of a switching element when the converter with a flying capacitor is boosted, and a change in inductor current according to the control example.

In FIG. 5, a switching period of the switching elements $S_1$ to $S_4$ is '2*Ts', and a current $I_L$ flowing through the inductor L increases and decreases repeatedly with a period of 'Ts' depending on the on/off state of each switching element.

Referring to FIG. 5, at interval 1, a gate signal G1 being supplied to a gate of the first switching element $S_1$ is in a high state, a gate signal G2 being supplied to a gate of the second switching element $S_2$ is in a low state, a gate signal G3 being supplied to a gate of the third switching element $S_3$ is in a high state, and a gate signal G4 being supplied to a gate of the fourth switching element $S_4$ is in a low state. That is, interval 1 may show the first state illustrated in FIG. 2 in which the first switching element $S_1$ and the third switching element $S_3$ are turned on, and the second switching element $S_2$ and the fourth switching element $S_4$ are turned off.

Subsequently, at interval 2, the gate signal G1 being supplied to the gate of the first switching element $S_1$ is in a low state, the gate signal G2 being supplied to the gate of the second switching element $S_2$ is in a low state, the gate signal G3 being supplied to the gate of the third switching element $S_3$ is in a high state, and the gate signal G4 being supplied to the gate of the fourth switching element $S_4$ is in a high state. That is, interval 2 may show the second state illustrated in FIG. 3 in which the third switching element $S_3$ and the fourth switching element $S_4$ are turned on, and the first switching element $S_1$ and the second switching element $S_2$ are turned off.

Subsequently, at interval 3, the gate signal G1 being supplied to the gate of the first switching element $S_1$ is in a low state, the gate signal G2 being supplied to the gate of the second switching element $S_2$ is in a high state, the gate signal G3 being supplied to the gate of the third switching element $S_3$ is in a low state, and the gate signal G4 being supplied to the gate of the fourth switching element $S_4$ is in a high state. That is, interval 3 may show the third state illustrated in FIG. 4 in which the second switching element $S_2$ and the fourth switching element $S_4$ are turned on, and the first switching element $S_1$ and the third switching element $S_3$ are turned off.

Interval 4 may show the second state illustrated in FIG. 3 again, in which the third switching element $S_3$ and the fourth switching element $S_4$ are turned on, and the first switching element $S_1$ and the second switching element $S_2$ are turned off.

At intervals 2 and 4, a current loop is formed by only using the inductor L and an input voltage $V_{in}$ and energy is stored in the inductor L, thereby gradually increasing the current $I_L$. At intervals 1 and 3, the voltage is applied to the capacitors $V_{DC}$ and $V_{FC}$ and the energy stored in the inductor is released, thereby reducing the current $I_L$.

When the converter including the flying capacitor is boosted, the voltage of the flying capacitor $C_{FC}$ is controlled by ½ times the voltage $V_{DC}$ of the output terminal, as illustrated in FIG. 5, the first switching element $S_1$ and the fourth switching element $S_4$ are operated to be complementary to each other, and the second switching element $S_2$ and the third switching element $S_3$ are operated to be complementary to each other. Moreover, when boosting of the converter including the flying capacitor is controlled, the switching elements $S_1$ to $S_4$ may be controlled so as to repeat the first state, the second state, the third state, and the second state in this order.

FIG. 5 illustrates an example of a control state of the switching elements when the output voltage $V_{DC}$ is twice or more the input voltage $V_{in}$, that is, a boost ratio is equal to or more than 200%. Even though the boost ratio is less than 200%, only the switching state of the switching elements is changed, the same may apply to conditions that the voltage of the flying capacitor $C_{FC}$ is controlled by ½ times the voltage $V_{DC}$ of the output terminal, the first switching element $S_1$ and the fourth switching element $S_4$ are operated to be complementary to each other, and the second switching element $S_2$ and the third switching element $S_3$ are operated to be complementary to each other.

In the example of FIG. 5, the low-state gate signal G2 is applied to the second switching element $S_2$ so as to be turned off. However, when the high-state gate signal is applied due to external noise or a control error as indicated by hatching in FIG. 5, the second switching element $S_2$ is short-circuited, not opened, such that in the entire circuit, the first to third switching elements $S_1$ to $S_3$ are short-circuited, and the fourth switching element $S_4$ is opened.

In this case, if the output voltage $V_{DC}$ is applied to the both ends of the fourth switching element $S_4$ to exceed an internal voltage of the switching element, the fourth switching element $S_4$ is damaged.

Various forms of the present disclosure provide a measure capable of solving such a problem of damaging the switching element by applying the voltage that exceeds the internal voltage in the converter with the flying capacitor.

Figure 6:
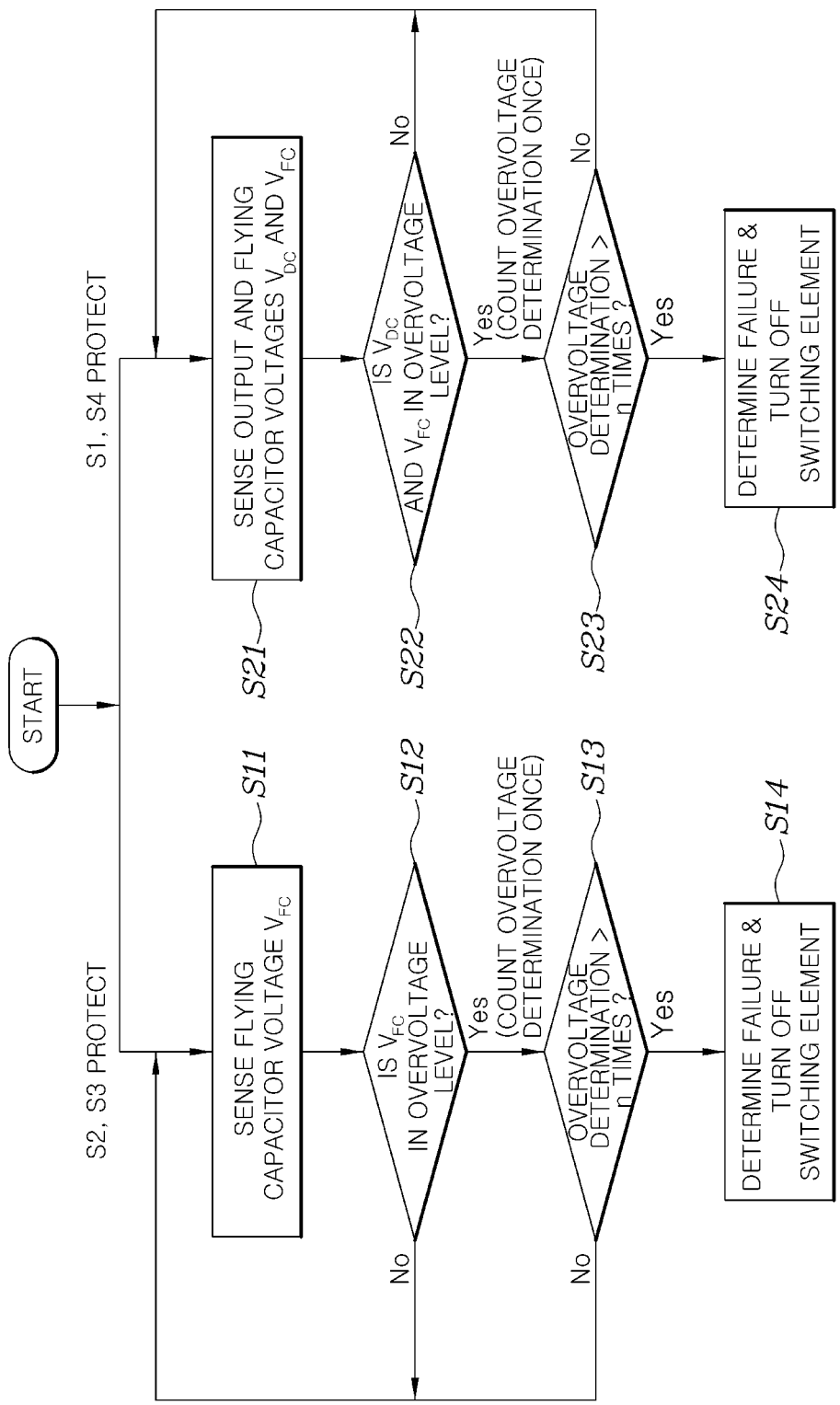
FIG. 6 is a flowchart illustrating a control method of a DC-DC converter in one form of the present disclosure.

FIG. 6 is a flowchart illustrating a control method of a DC-DC converter in some forms of the present disclosure.

The control method of a DC-DC converter in some forms of the present disclosure may be performed by the controller 10 included in the DC-DC converter.

Referring to FIG. 6, the control method of a DC-DC converter in some forms of the present disclosure may be performed based on the sensed voltage obtained by sensing the voltage $V_{FC}$ applied to the second capacitor $C_{FC}$ corresponding to a flying capacitor, and the sensed voltage obtained by sensing the voltage $V_{DC}$ applied to the first capacitor $C_{DC}$ provided at the output terminal.

First, the sensed voltage obtained by sensing the voltage $V_{FC}$ applied to the second capacitor $C_{FC}$ may be used for protecting the second and third switching elements $S_2$ and $S_3$.

The second and third switching elements $S_2$ and $S_3$ are switches constituting a closed loop with the second capacitor $C_{FC}$. The sum of the voltages each applied to the second and third switching elements $S_2$ and $S_3$ have the same value as the voltage $V_{FC}$ applied to the second capacitor $C_{FC}$ based on the Kirchhoff's Voltage Law.

Since the second and third switching elements $S_2$ and $S_3$ are operated to be complementary to each other, if the second switching element $S_2$ is short-circuited and the voltage applied to the second switching element $S_2$ is 0, the voltage applied to the third switching element $S_3$ is the same value as the voltage $V_{FC}$ applied to the second capacitor $C_{FC}$. Similarly, if the third switching element $S_3$ is short-circuited and the voltage applied to the third switching element $S_3$ is 0, the voltage applied to the second switching element $S_2$ is the same value as the voltage $V_{FC}$ applied to the second capacitor $C_{FC}$.

Accordingly, the second and third switching elements $S_2$ and $S_3$ may be protected based on the voltage $V_{FC}$ applied to the second capacitor $C_{FC}$.

That is, the voltage $V_{FC}$ applied to the second capacitor $C_{FC}$ may be sensed (S11), and the sensed voltage is counted when it is larger than a preset reference value for overvoltage determination (S12). When the number of times of determination that the sensed voltage is larger than the preset reference value for overvoltage determination exceeds the preset number of times (S13), it is determined that the overvoltage is applied to the both ends of the second switching element $S_2$ or third switching element $S_3$ (S14). Since such application of the overvoltage may be caused by controlling the switching elements or excessive noise generation in a converter system, step S14 may be replaced with a determination that a failure has occurred in the converter system itself.

When it is determined in step S14 that the failure has occurred, the controller 10 may allow all the switching elements $S_1$ to $S_4$ of the converter to turn off to stop the operation of the converter.

In this case, the preset reference value for overvoltage determination may have a smaller value than an internal voltage defined in a specification of the switching elements by applying a predetermined margin to the internal voltage corresponding to the specification. This is to prevent the switching element from being damaged in advance by applying a larger voltage than the internal voltage of the switching element, such that it is possible to determine that the number of times of applying, to the switch, a larger voltage than the reference value for overvoltage determination having a smaller value than the internal voltage, to avoid in advance a case where the voltage larger than the internal voltage of the switching element is applied.

Next, the sensed voltage obtained by sensing the voltage $V_{FC}$ applied to the second capacitor $C_{FC}$ and the voltage $V_{DC}$ of the output terminal of the converter may be used for protecting the first and fourth switching elements $S_1$ and $S_4$.

A closed loop is formed through the first and fourth switching elements $S_1$ and $S_4$, the second capacitor $C_{FC}$, and the first capacitor $C_{DC}$ corresponding to an output terminal capacitor. Accordingly, the sum of the voltages across the first and fourth switching elements $S_1$ and $S_4$ may be the same value as a difference between the voltage $V_{DC}$ applied to the first capacitor $C_{DC}$ and the voltage $V_{FC}$ applied to the second capacitor $C_{FC}$ based on the Kirchhoff's Voltage Law.

Since the first and fourth switching elements $S_1$ and $S_4$ are operated to be complementary to each other, the maximum value of each of the voltage applied to the first switching element $S_1$ and the voltage applied to the fourth switching element $S_4$ is the difference between the voltage $V_{DC}$ applied to the first capacitor $C_{DC}$ and the voltage $V_{FC}$ applied to the second capacitor $C_{FC}$.

Therefore, the first and fourth switching elements $S_1$ and $S_4$ are protected based on the difference between the voltage $V_{DC}$ applied to the first capacitor $C_{DC}$ and the voltage $V_{FC}$ applied to the second capacitor $C_{FC}$.

That is, each of the voltage $V_{DC}$ applied to the first capacitor $C_{DC}$ and the voltage $V_{FC}$ applied to the second capacitor $C_{FC}$ is sensed (S21), and the difference between the sensed voltage obtained by sensing the voltage $V_{DC}$ applied to the first capacitor $C_{DC}$ and the sensed voltage obtained by sensing the voltage $V_{FC}$ applied to the second capacitor $C_{FC}$ is counted when the difference thereof is larger than the preset reference value for overvoltage determination (S22). When the number of times of determination that the difference between the sensed voltages is larger than the preset reference value for overvoltage determination exceeds the preset number of times (S23), it is determined that a failure has occurred in the converter system itself (S24).

When it is determined in step S24 that the failure has occurred, the controller 10 may allow all the switching elements $S_1$ to $S_4$ of the converter to turn off to stop the operation of the converter.

As described above, in some forms of the present disclosure, it is possible to prevent the switching element from being damaged by sensing the overvoltage applied to the both ends of each switching element in advance when the converter to which the flying capacitor is applied is operated, based on the sensed voltages sensed by the voltage sensors that are provided in the output terminal capacitor and the flying capacitor.

According to the DC-DC converter and the control method thereof, it is possible to prevent the switching element from being damaged by sensing the overvoltage applied to the both ends of each switching element in advance when the converter to which the flying capacitor is applied is operated, based on the sensed voltages sensed by the voltage sensors that are provided in the output terminal capacitor and the flying capacitor.

The effects of the present disclosure are not limited to the above-described effects and other effects which are not described herein will become apparent to those skilled in the art from the following description.

Although the present disclosure has been shown and described with respect to specific forms, it will be apparent to those having ordinary skill in the art that the present disclosure may be variously modified and altered without departing from the spirit and scope of the present disclosure as defined by the following claims.

What is claimed is:

1. A DC-DC converter, comprising:
a first capacitor;
a first switching element, a second switching element, a third switching element, and a fourth switching element sequentially connected to one another in series between both ends of the first capacitor;
a second capacitor having both ends connected at a connection node of the first switching element and the second switching element and a connection node of the third switching element and the fourth switching element, respectively; and
a controller configured to determine whether an overvoltage is applied to both ends of the first to fourth switching elements, respectively, based on a first sensed voltage obtained by sensing a voltage applied to the first capacitor and a second sensed voltage obtained by sensing a voltage applied to the second capacitor.

2. The DC-DC converter of claim 1, wherein the controller is configured to:
control states of the second switching element and the third switching element to be complementary; and
determine whether the overvoltage is applied to the both ends of the second switching element or third switching element based on a comparison result between the second sensed voltage and a preset reference value.

3. The DC-DC converter of claim 2, wherein the controller is configured to:
determine that the overvoltage is applied to the both ends of the second switching element or third switching element when the second sensed voltage is greater than the preset reference value.

4. The DC-DC converter of claim 2, wherein the controller is configured to:
determine that the overvoltage is applied to the both ends of the second switching element or third switching element when a number of times of determination that the second determination voltage is greater than the preset reference value exceeds the preset reference value.

5. The DC-DC converter of claim 1, wherein the controller is configured to:
control states of the first switching element and the fourth switching element to be complementary; and
determine whether the overvoltage is applied to the both ends of the first switching element or fourth switching element based on a comparison result between a difference value and a preset reference value, wherein the difference value is obtained by subtracting the second sensed voltage from the first sensed voltage.

6. The DC-DC converter of claim 5, wherein the controller is configured to:
determine that the overvoltage is applied to the both ends of the first switching element or fourth switching element when the difference value obtained by subtracting the second sensed voltage from the first sensed voltage is greater than the preset reference value.

7. The DC-DC converter of claim 2, wherein the controller is configured to:
determine that the overvoltage is applied to the both ends of the first switching element or fourth switching element when a number of times of determination that the difference value obtained by subtracting the second sensed voltage from the first sensed voltage is greater than the preset reference value exceeds the preset reference value.

8. The DC-DC converter of claim 2, wherein the reference value is less than an internal voltage defined by the first to fourth switching elements by applying a predetermined margin to the internal voltage.

9. The DC-DC converter of claim 5, wherein the reference value is less than an internal voltage defined by the first to fourth switching elements by applying a predetermined margin to the internal voltage.

10. A control method of a DC-DC converter including a first capacitor; a first switching element, a second switching element, a third switching element, and a fourth switching element sequentially connected to one another in series between both ends of the first capacitor; and a second capacitor having both ends connected at a connection node of the first switching element and the second switching element and a connection node of the third switching element and the fourth switching element, respectively, the control method comprising:
controlling states of the second switching element and the third switching element to be complementary;
sensing a voltage applied to the second capacitor;
comparing a sensed voltage obtained by sensing the voltage applied to the second capacitor with a preset reference value for overvoltage determination; and
determining that an overvoltage is applied to the both ends of the second switching element or third switching element when the sensed voltage is greater than the preset reference value.

11. The control method of claim 10, wherein determining that the overvoltage is applied comprises:
determining that the overvoltage is applied to the both ends of the second switching element or third switching element when a number of times of determination that the sensed voltage is greater than the preset reference value exceeds than the preset reference value.

12. The control method of claim 10, wherein the reference value is a less than an internal voltage defined by the first to fourth switching elements by applying a predetermined margin to the internal voltage.

13. A control method of a DC-DC converter including a first capacitor; a first switching element, a second switching element, a third switching element, and a fourth switching element sequentially connected to one another in series between both ends of the first capacitor; and a second capacitor having both ends connected at a connection node of the first switching element and the second switching element and a connection node of the third switching element and the fourth switching element, respectively, the control method comprising:
controlling states of the first switching element and the fourth switching element to be complementary;
sensing a voltage applied to the first capacitor and a voltage applied to the second capacitor;
comparing a difference value with a predetermined reference value for overvoltage determination, wherein the difference value is obtained by subtracting a second sensed voltage obtained by sensing the voltage applied to the second capacitor from a first sensed voltage obtained by sensing the voltage applied to the first capacitor; and determining that an overvoltage is applied to the both ends of the first switching element or fourth switching element when the difference value is greater than the preset reference value.

14. The control method of claim 13, wherein determining that the overvoltage is applied comprises:
determining that the overvoltage is applied to the both ends of the first switching element or fourth switching element when a number of times of determination that the difference value is greater than the preset reference value exceeds the preset reference value.

15. The control method of claim 13, wherein the reference value is a less than an internal voltage defined by the first to fourth switching elements by applying a predetermined margin to the internal voltage.

* * * * *